S. Kinney,
Saw Swage.
No. 98,695.  Patented Jan. 11, 1870.

Inventor.
Simon Kinney,

Witnesses.

United States Patent Office.

SIMON KINNEY, OF BIGNELLVILLE, NEW YORK.

Letters Patent No. 98,695, dated January 11, 1870.

IMPROVEMENT IN SAW-SWAGE.

The Schedule referred to in these Letters Patent and making part of the same.

I, SIMON KINNEY, of the village of Bignellville, in the county of St. Lawrence, in the State of New York, have invented a Machine for Swaging the Teeth of Saws, of which the following is a specification.

The invention relates to the construction of a machine for swaging and forming the teeth of saws, in which the saw-plate is held and adjusted to an anvil, by a sliding frame, operated by a hand-screw, which runs upon rails raised from the bed or stock of the machine. A pressing-block, operated by a cam, retains the tooth upon the anvil laterally, and a swage-bar, operated by cams, compresses the tooth longitudinally against a face-block or die, and displays or widens its top. The front of the saw lies against an adjustable stop, and by it, the teeth are regulated to the anvil.

A represents the stock or bed of the machine, which is bolted, through holes B, to a post, or other fixture.

C is a slot, cast in the stock, bevelled on each side, in which slides a socket-piece, D, which is attached to a cross-head, E, at right angles.

Near each end of the cross-head E, and passing through it, are set-screws $a$, to adjust a bar, F, upon its centre or curve, to the back of the saw, which is placed in a groove therein, so that each tooth may be readily adjusted and placed fairly on the anvil, according as the saw may vary in width.

The ends of the bars E and F are slotted, and slide upon rails G, on each side of the stock.

The sliding socket D is operated by a hand-screw, H, which passes through a loop, I, connected with the stock.

The anvil J is raised above the bed of the stock, and is made of solid, hard steel. Upon it the tooth of the saw rests when being swaged.

The tooth is held firmly to the anvil by a pressing-block, K, which is depressed by means of a cam-lever, L, and when released, is raised by a spring, L'.

M is an angular-shaped steel bar or die, passing through the stock and its top plate.

Against it the tooth of the saw is pressed longitudinally, by the swage-bar P. It is reversible, so that should one of its faces become injured, the face on the opposite end may be used, by inverting the bar.

N is an adjustable stop, against which the teeth of the saw lie, so that they can be readily and uniformly passed to the anvil.

This stop is held in any required position, according to the varying width of the saw, by clamp-screws O O, passing through elongated holes in the plate.

The swage-bar P may be reversed, so that when the lower side is placed up, it will give a new pressing-face toward the tooth, should the other one become defaced. It is kept in position by stationary guide-pieces Q Q, on both sides.

In one of the pieces is a slot, in which is placed a coiled spring, R, to remove the swage-bar from the tooth when it has been released by the cams, as hereafter explained.

One end of the coiled spring rests against an end of the slot, and the other presses against a shoulder, S, projecting from the swage-bar P.

The swage-bar P is operated from its end by a segmental oscillating toothed disk or cam, T, which gears with the teeth of a cam-lever, U, in which is a socket, to receive the handle V. The journal of the disk T oscillates in a slot in the stock.

The cover-plate W is fastened to the stock by bolts and nuts $x$.

The stock A has an angle-bar, Y, on its back, to add to its strength.

Figures 1, 4, 5:
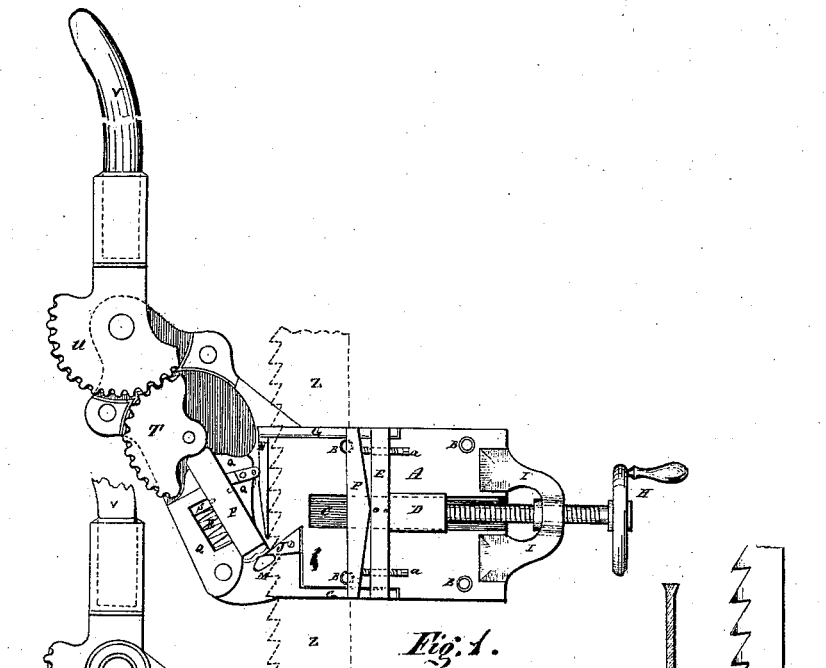
Figure 1 represents a front sectional elevation of the machine.
Figure 4 is an end view of the tooth after being swaged.
Figure 5 is a side view of the same.
Figure 2:
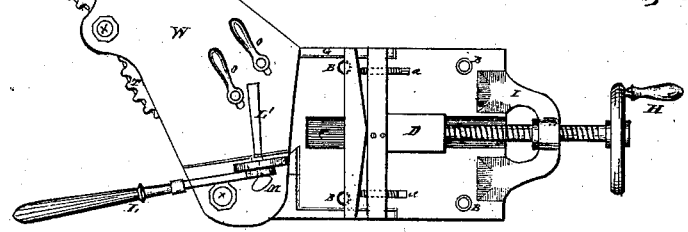
Figure 2 is a front view.
Figure 3:
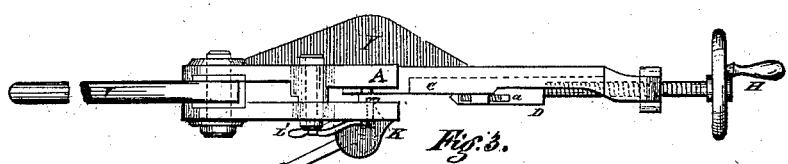
Figure 3 is an end view of the same.

The operation of the machine is as follows:

The saw Z is placed between the bar F and the stop N, with the teeth toward the latter, and they are separately adjusted, by means of the hand-screw H and clamp-screws O O, so that each tooth will fairly rest upon the anvil J. The cam-lever L is then brought down, to depress the pressing-block K on the side of the tooth, and hold it against the anvil, to prevent it from crippling or buckling when the swage-bar P comes in contact with it. The handle V is then depressed, by which means the cam U presses inwardly the segmental disk or cam T, and forces the swage-bar P against the tooth of the saw, and by the compression against the bar M, the tooth is widened or displayed, as shown in figs. 4 and 5.

I claim, as my invention—

1. In combination with the stock A, the sliding socket D, cross-head E, and adjustable bar F, arranged and operated as described, for the purpose set forth.

2. The arrangement and combination, with the stock A, of the adjustable stop N, operated as described, and for the purpose set forth.

3. The anvil J, bar M, and compressing-block K, and the operation of the latter by the cam-lever L and spring L', for the purposes mentioned.

4. The swage-bar P and guides Q Q, and the arrangement and combination of the cam-disk T, cam-lever U, spring R, and handle V, for pressing the teeth of the saw against the bar M, substantially as described and set forth.

SIMON KINNEY.

Witnesses:
HENRY GRIST,
JOHN GRIST, Jr.